(12) United States Patent
Maro

(10) Patent No.: US 10,993,367 B2
(45) Date of Patent: May 4, 2021

(54) COMMODITY DELIVERY SYSTEM FOR WORK VEHICLE WITH VENTURI SUCTION GENERATOR

(71) Applicant: Deere & Company, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 203 days.

(21) Appl. No.: 16/121,731

(22) Filed: Sep. 5, 2018

(65) Prior Publication Data

US 2020/0068791 A1 Mar. 5, 2020

(51) Int. Cl.
*A01C 7/20* (2006.01)
*A01C 7/04* (2006.01)
*A01C 7/08* (2006.01)
*A01C 7/10* (2006.01)
*A01C 15/00* (2006.01)

(52) U.S. Cl.
CPC .............. *A01C 7/206* (2013.01); *A01C 7/044* (2013.01); *A01C 7/082* (2013.01); *A01C 7/102* (2013.01); *A01C 7/081* (2013.01); *A01C 15/006* (2013.01)

(58) Field of Classification Search
CPC ......... A01C 7/206; A01C 7/044; A01C 7/082; A01C 7/102; A01C 7/081; A01C 15/006
See application file for complete search history.

(56) References Cited

U.S. PATENT DOCUMENTS 4,060,181 A * 11/1977 Grataloup .............. A01C 7/081
406/93
5,524,559 A * 6/1996 Davidson ................ A01C 7/081
111/200
(Continued)

FOREIGN PATENT DOCUMENTS

DE 102004025758 12/2005
EP 2859785 4/2015
(Continued)

OTHER PUBLICATIONS http://www.exair.com/products/air-operated-conveyors.html, Exair Corporation, Air Operated Conveyors, Copyright 2018.
(Continued)

*Primary Examiner* — Jessica Cahill
*Assistant Examiner* — Patrick C Williams
(74) *Attorney, Agent, or Firm* — Klintworth & Rozenblat IP LLP

(57) ABSTRACT

A work vehicle includes a delivery system with a run. The run includes an upstream flow structure having an inlet that is configured to receive metered commodity and a suction generator structure with a flow passage that is in fluid communication with the inlet. The flow passage includes a venturi profile with a restricting section and an expanding section. Furthermore, the run includes a downstream flow structure configured to receive the metered commodity via the flow passage and an airstream that conveys the metered commodity in a downstream direction through the downstream flow structure. A compressed air source is configured to provide pressurized air through the flow passage to create suction to suck the metered commodity away from the metering system and toward the downstream flow structure.

20 Claims, 3 Drawing Sheets

(56) References Cited

U.S. PATENT DOCUMENTS

| | | | | |
|---|---|---|---|---|
| 5,831,542 A | * | 11/1998 | Thomas | A01C 7/105 |
| | | | | 340/684 |
| 5,845,818 A | | 12/1998 | Gregor et al. | |
| 9,924,627 B1 | | 3/2018 | Beaujot et al. | |
| 2014/0049395 A1 | * | 2/2014 | Hui | A01C 7/081 |
| | | | | 340/608 |
| 2015/0366127 A1 | * | 12/2015 | Roberge | A01M 7/0003 |
| | | | | 239/8 |
| 2016/0192581 A1 | | 7/2016 | Henry | |
| 2017/0073154 A1 | | 3/2017 | Borkgren et al. | |
| 2017/0073155 A1 | | 3/2017 | Borkgren et al. | |

FOREIGN PATENT DOCUMENTS

| | | |
|---|---|---|
| IT | PD20130320 | 5/2015 |
| WO | 2005018302 | 3/2005 |

OTHER PUBLICATIONS

European Search Report issued in European Patent Application No. 19195126.8 dated Jan. 31, 2020 (13 pages).

* cited by examiner

COMMODITY DELIVERY SYSTEM FOR WORK VEHICLE WITH VENTURI SUCTION GENERATOR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity delivery system for a work vehicle with a venturi suction generator.

BACKGROUND OF THE DISCLOSURE

Seeding work vehicles, such as air carts/seeders and other seeding devices, are configured for applying seed, fertilizer, and/or other particulate commodities to a field. The work vehicle may be operatively connected to tilling equipment for applying the commodity under the surface of the soil.

Seeding work vehicles typically include one or more tanks and a metering system that meters out a predetermined quantity of the commodity from the tank as the work vehicle moves across the field. These vehicles often include a delivery system for delivering the commodity to one or more row units for delivery to the soil.

SUMMARY OF THE DISCLOSURE

This disclosure provides an improved commodity delivery metering system for a work vehicle. This disclosure also provides methods for operating the same.

In one aspect, the disclosure provides a work vehicle that includes a commodity container that contains a commodity. The work vehicle also includes a metering system configured to meter the commodity out from the commodity container at a predetermined rate. Furthermore, the work vehicle includes a delivery system with a run configured to convey the metered commodity away from the work vehicle. The run includes an upstream flow structure having an inlet that is configured to receive the metered commodity from the metering system. The upstream flow structure includes a suction generator structure with a flow passage that is in fluid communication with the inlet. The flow passage includes a venturi profile with a restricting section and an expanding section. Furthermore, the run includes a downstream flow structure that is fluidly connected to the upstream flow structure to receive the metered commodity from the flow passage. The downstream flow structure is configured to receive an airstream that conveys the metered commodity in a downstream direction through the downstream flow structure. The run additionally includes a compressed air source that is fluidly connected to the suction generator structure. The compressed air source is configured to provide pressurized air through the flow passage to create suction at the inlet that sucks the metered commodity from the inlet and moves the metered commodity away from the inlet and toward the downstream flow structure.

In another aspect, the disclosure provides a method of operating a work vehicle. The method includes metering, with a metering system, a commodity at a predetermined rate from a commodity container to an inlet. Furthermore, the method includes selectively providing a pressurized airflow through a flow passage of a suction generator structure of a delivery system. The flow passage includes a venturi profile with a restricting section and an expanding section. The flow passage is downstream of and in fluid communication with the inlet. The selectively provided pressurized airflow creates suction at the inlet to suck the metered commodity from the inlet and move the metered commodity away from the inlet and toward a downstream flow structure. Additionally, the method includes selectively providing an airstream to the downstream flow structure to convey the metered commodity in a downstream direction through the downstream flow structure.

In an additional aspect, the disclosure provides a work vehicle that includes a commodity container that contains a commodity. The work vehicle includes a metering system configured to meter the commodity out from the commodity container at a predetermined rate. The work vehicle also includes a delivery system with a run configured to convey the metered commodity away from the work vehicle. The run includes a first branch flow structure configured to receive an airstream and conduct the airstream in a downstream direction. The run also includes a second branch flow structure having an inlet that is configured to receive the metered commodity from the metering system. The second branch flow structure includes a suction generator structure with a flow passage that is downstream of and in fluid communication with the inlet. The flow passage includes a venturi profile with a restricting section and an expanding section. Additionally, the run includes a downstream flow structure with a mixing chamber that is fluidly connected to the first branch flow structure and the second branch flow structure to receive the airstream and the metered commodity from the flow passage and convey the metered commodity in the downstream direction. Moreover, the run includes a compressed air source that is fluidly connected to the suction generator structure. The compressed air source is configured to provide pressurized air through the flow passage to create suction that draws the metered commodity from the inlet and moves the metered commodity away from the inlet and toward the downstream flow structure.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
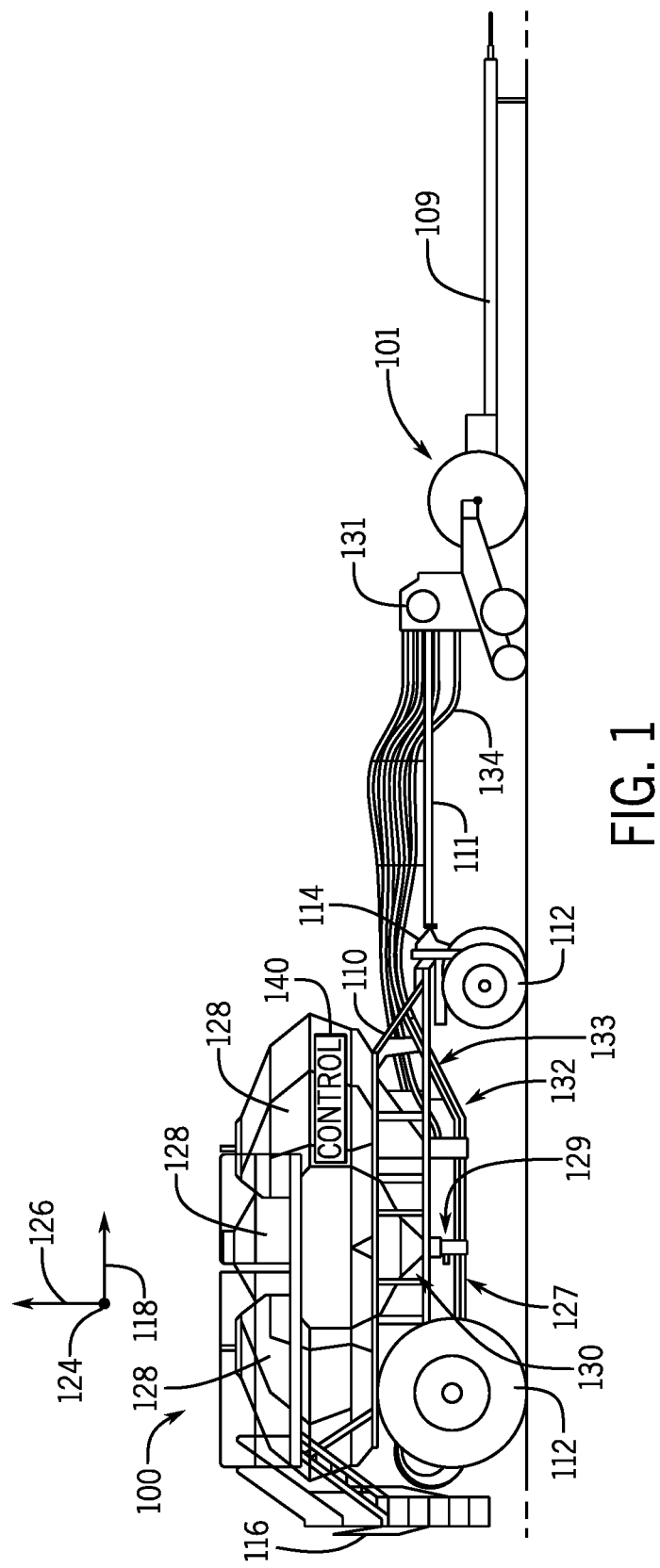
FIG. 1 is a side view of a work vehicle according to example embodiments of the present disclosure.

The following describes one or more example embodiments of a commodity delivery system (i.e., a conveyance system) for a work vehicle. The work vehicle may be of any suitable type, such as an air cart, commodity cart, etc. The present disclosure also includes control systems and methods for operating the delivery system. Embodiments of the present disclosure are shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of a work vehicle delivery system for delivering and conveying a commodity to a location spaced away from the vehicle (e.g., to a plurality of planter tools, row units, etc. that deliver the commodity to the soil) as shown in the accompanying figures of the drawings described briefly above. The delivery system may be configured to receive a commodity from a commodity container and a metering system, both disposed upstream of the delivery system with respect to the direction of commodity flow.

The delivery system may include at least one run with a branch that fluidly connects to a downstream mixing chamber. A relative high-volume, low pressure airstream may be conducted through this branch to the mixing chamber. In some embodiments, a fan may be connected to this branch to generate this airstream through this branch of the run.

The run may also include another branch that extends between the inlet from the metering system and the downstream mixing chamber. This other branch may include a venturi suction generator structure (venturi vacuum generator) that is configured to create a vacuum (a suction force) that draws and conveys the commodity from the inlet toward the mixing chamber. The suction generator structure may include a flow passage with a venturi profile (i.e., having a restricting section and an expanding section). The suction generator structure may also be connected to a compressed fluid source (e.g. a compressed air source) configured to provide a relatively high-pressure, low volume compressed airstream.

During operation of the work vehicle, the fan may generate the high volume, low pressure fluid through the one branch to the mixing chamber. Also, the compressed fluid source may provide the compressed airstream to flow at least part way through the venturi suction generator. This creates a suction force that draws the commodity from a metering element via an outlet of the metering system. This commodity flows to the mixing chamber and into the high-volume, low pressure fluid stream for further conveyance downstream in the run.

The commodity inlet and commodity outlet of the suction generator may be aligned and centered with respect to the axis of the flow passage of the venturi suction generator structure. As such, commodity flow through the structure may be unobstructed and directed largely along the axis. There is little likelihood of clogging, thus ensuring efficient and effective delivery of the commodity through the run.

In some embodiments, the suction created is sufficient enough such that pressure proximate the outlet of the metering system is lower than areas of the metering system and/or areas in the upstream commodity container. As such, the commodity container may be open to atmosphere, unpressurized, and/or unsealed. Regardless, commodity flow from the container through the metering system may be maintained. The suction created may be sufficient to prevent backflow of the commodity to the metering system without causing a significant pressure drop across the metering system. This permits the metering element(s), commodity container(s) and segments of the runs upstream of the metering system to be at or near atmospheric pressure, such that pressurization, and the attendant sealing, of the commodity containers can be reduced or avoided entirely. Non-significant pressure drops across the metering system as pertains to this disclosure are in the range of zero to plus or minus five inches of water. In some cases, improved efficiencies can be achieved by operating at a pressure differential of less than three inches of water, and ideally, the pressure drop across the metering system is at or less than plus or minus one inch of water.

Furthermore, the commodity may flow from the container, through the metering system to the delivery system through a series of components. There may be a plurality of joints where these components are attached. There may be little to no need to seal these joints. The suction created by the delivery system can suck in atmospheric air at the joint instead of flowing outward. Thus, leakage is unlikely.

FIG. 1 illustrates a work vehicle 100 according to example embodiments of the present disclosure. In the illustrated embodiment, the work vehicle 100 may be towed by another vehicle, such as a tractor (not shown), either before or after the ground-working tool in the direction of travel of the vehicle train. In other embodiments, the work vehicle 100 of the present disclosure may be a self-propelled vehicle. In some embodiments, the work vehicle 100 may be an air cart or air drill that contains a bulk amount of a commodity, that meters out the commodity from the bulk amount, and that moves the metered commodity away from the work vehicle 100 for planting in the ground. In some embodiments, the commodity delivered from the work vehicle 100 may be metered further downstream before being planted.

The work vehicle 100 shown in FIG. 1 is merely an example embodiment of the present disclosure. One or more features of the present disclosure may be included on a different work vehicle, such as a planter, a commodity cart, or other work vehicle without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together and arranged in series along the lateral axis 124. Thus, although only one row unit 101 is shown in FIG. 1, it will be appreciated that similar row units 101 may be included and disposed in series along the lateral axis 124. The row units 101 may be connected to the work vehicle 100 via a rear tow bar 111. The row units 101 may also be connected to the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected to the work vehicle 100 (i.e., directly connected to the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row units 101.

The work vehicle 100 may further include one or more commodity containers 128 (tanks, vessels, or other commodity source). The containers 128 may be supported on the frame 110. The commodity containers 128 may contain seed, fertilizer, and/or another particulate or granular commodity. Additionally, in some embodiments, the containers 128 may include a liquid commodity. There may be any number of containers 128. In the illustrated embodiment, for example, there are four commodity containers 128, one of which is hidden from view.

Additionally, the work vehicle 100 may include at least one metering system 130. The metering system 130 may be a volumetric metering system. In some embodiments, there may be a different metering system 130 for the different commodity containers 128. The metering system 130 may be configured to receive commodity from the commodity container 128 and may meter commodity to a downstream component. In some embodiments, the metering system 130 may be supported by the frame 110 and may be disposed generally underneath the commodity container(s) 128. The work vehicle 100 may include a plurality of metering elements (e.g., metering rollers) that actuate to meter out the commodity from the commodity container 128. During operation, particles of the commodity within one of the containers 128 may move vertically downward toward the metering system 130. The metering system 130 may operate to meter out the commodity from the container 128 at a controlled rate as the vehicle 100 moves across the field.

The work vehicle 100 may also include a delivery system 132. The delivery system 132 may include at least one delivery run 133, with multiple runs being incorporated when multiple metering elements are used. The runs 133 may include pipes, tubes, lines, conduits, etc. that are supported by the frame 110 below the metering system 130. The runs 133 may receive metered commodity from the metering system 130 and may be may be in fluid communication with downstream components (e.g., downstream pipe segments in the respective run 133, downstream manifolds, and/or the row units 101).

The runs 133 may conduct a flow of air from the rear end 116 to the front end 114 and away from the work vehicle 100. Airflow within the runs 133 may be generated by a fan or other source mounted on the vehicle 100 as will be discussed below.

The commodity metered out by the metering system 130 may be received by the runs 133. In some embodiments, the particles may move substantially vertically downward into the runs 133. Once inside the runs 133, the air stream therein may propel and convey the metered particles away from the work vehicle 100 and toward the row units 101.

Moreover, the work vehicle 100 may include a control system 140. The control system 140 may include and/or communicate with various components of a computerized device, such as a processor 141, a data storage device, a user interface, etc. The control system 140 may be in communication with and may be configured for controlling the metering system 130, the delivery system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the delivery system 132, etc.

Figure 2:
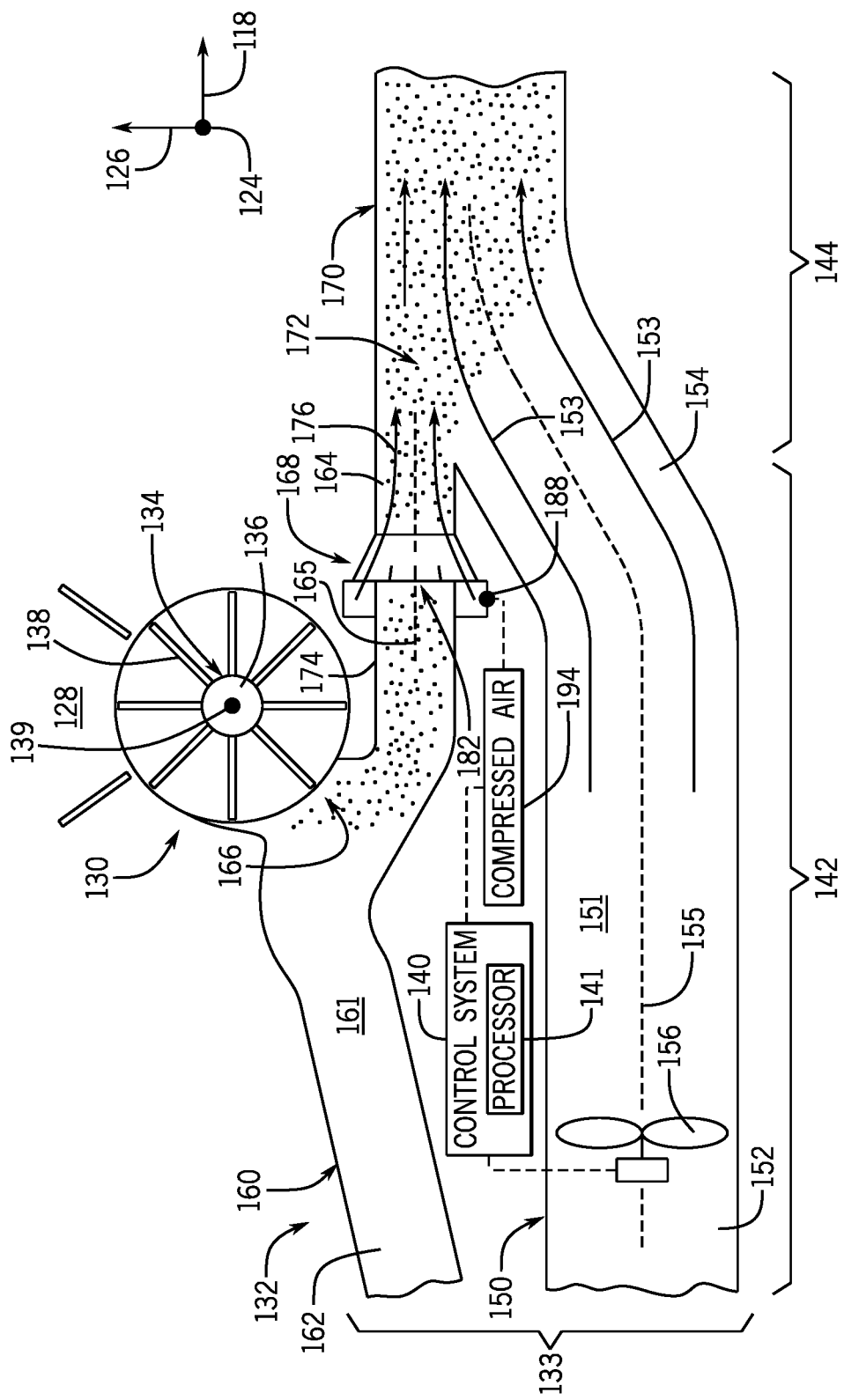
FIG. 2 is a schematic view of a metering system and a delivery system of the work vehicle of FIG. 1.

Referring now to FIG. 2, the metering system 130 and the delivery system 132 is schematically illustrated and will be discussed in greater detail according to example embodiments. As shown, the metering system 130 may include at least one metering element 134, such as a metering roller 136 with a plurality of radially-extending flutes 138. The metering roller 136 may be supported for rotation about an axis 139. In some embodiments, the axis 139 may extend substantially parallel to the lateral axis 124. There may be a plurality of metering rollers 136 arranged along the axis 139. The metering rollers 136 may receive commodity from the commodity container 128. In some embodiments, there may be a plurality of metering rollers 136 that are supported on a cartridge assembly, for example, as disclosed in U.S. Pat. No. 5,845,818, issued Dec. 8, 1998 to Gregor et al., the disclosure of which is incorporated by reference in its entirety.

The delivery system 132 may include at least one run 133 configured according to the illustrated embodiment. The run 133 may include an upstream portion 142 and a downstream portion 144. As shown, the run 133 may extend generally along the axis 118 of the work vehicle 100. As shown, the axis 139 of the metering system 130 (the metering axis) may be substantially perpendicular to the flow direction of the run 133.

The upstream portion 142 of the run 133 may include a first branch flow structure 150. The first branch flow structure 150 may be a pipe with a relatively large diameter. The first branch flow structure 150 may define an interior channel 151 that extends along a longitudinal axis 155 from an upstream end 152 to a downstream end 154. The upstream end 152 may be open to atmosphere in some embodiments. The longitudinal axis 155 may be nonlinear in some embodiments as shown.

The delivery system 132 may further include a fan 156. The fan 156 may be operatively connected to and supported within the interior channel 151 of the first branch flow structure 150. In certain other embodiments, the fan 156 may be mounted to the work vehicle 100 exterior and communicate with the run(s) (e.g., at the interior channel 151) through a plenum or manifold (not shown). As will be discussed, the fan 156 may operate to blow positive pressure air and create an airstream within the first branch flow structure 150. This airstream is represented in FIG. 2 by arrows 153. The airstream 153 may be characterized as a relatively "high volume, low pressure airstream".

Furthermore, the upstream portion 142 of the run 133 may include a second branch flow structure 160. The second branch flow structure 160 may be a tube with a relatively small diameter (as compared to the first branch flow structure 150). The second branch flow structure 160 may define an interior channel 161 that extends along a longitudinal axis 165 from an upstream opening 162 to a downstream end 164. The diameter of the interior channel 161 may change along the axis 165. For example, the diameter may taper gradually downward and become narrower in the downstream direction. The axis 165 may be nonlinear in some embodiments. The upstream opening 162 may be open to atmosphere in some embodiments.

The second branch flow structure 160 may also include a side inlet 166, which communicates with an outlet of the metering system 130 to receive metered commodity from the metering element 134. In some embodiments, the inlet 166 may extend radially through a side wall of the second branch flow structure 160. The inlet 166 may be shaped in a variety of ways to provide efficient delivery of the metered commodity into the interior channel 161 of the second branch flow structure 160.

The second branch flow structure 160 may further include a suction generator structure 168. As will be discussed in detail below, the structure 168 may have a flow passage 182 that is in fluid communication with the inlet 166. The flow passage 182 may be downstream of the inlet 166. For example, the second branch flow structure 160 may include an intermediate segment 174 that extends between the inlet 166 to the flow passage 182. In some embodiments, the intermediate segment 174 may define at least a portion of the flow passage 182. The flow passage 182 may be centered on the axis 165 of the second branch flow structure 160. In some embodiments, the suction generator structure 168 may be disposed proximate the downstream end 164 of the second branch flow structure 160. The suction generator structure 168 may be used to generate a vacuum that serves to draw commodity from the inlet 166.

The downstream portion 144 of the run 133 may include a downstream flow structure 170. The downstream flow structure 170 may be a pipe with a relatively large diameter, comparable to that of the first branch flow structure 150. The downstream flow structure 170 may include a mixture chamber 172 that is fluidly connected to the downstream end 154 of the first branch flow structure 150 and the downstream end 164 of the second branch flow structure 160. Accordingly, the mixture chamber 172 may receive both the airstream 153 and the metered commodity from the flow passage 182.

Figure 3:
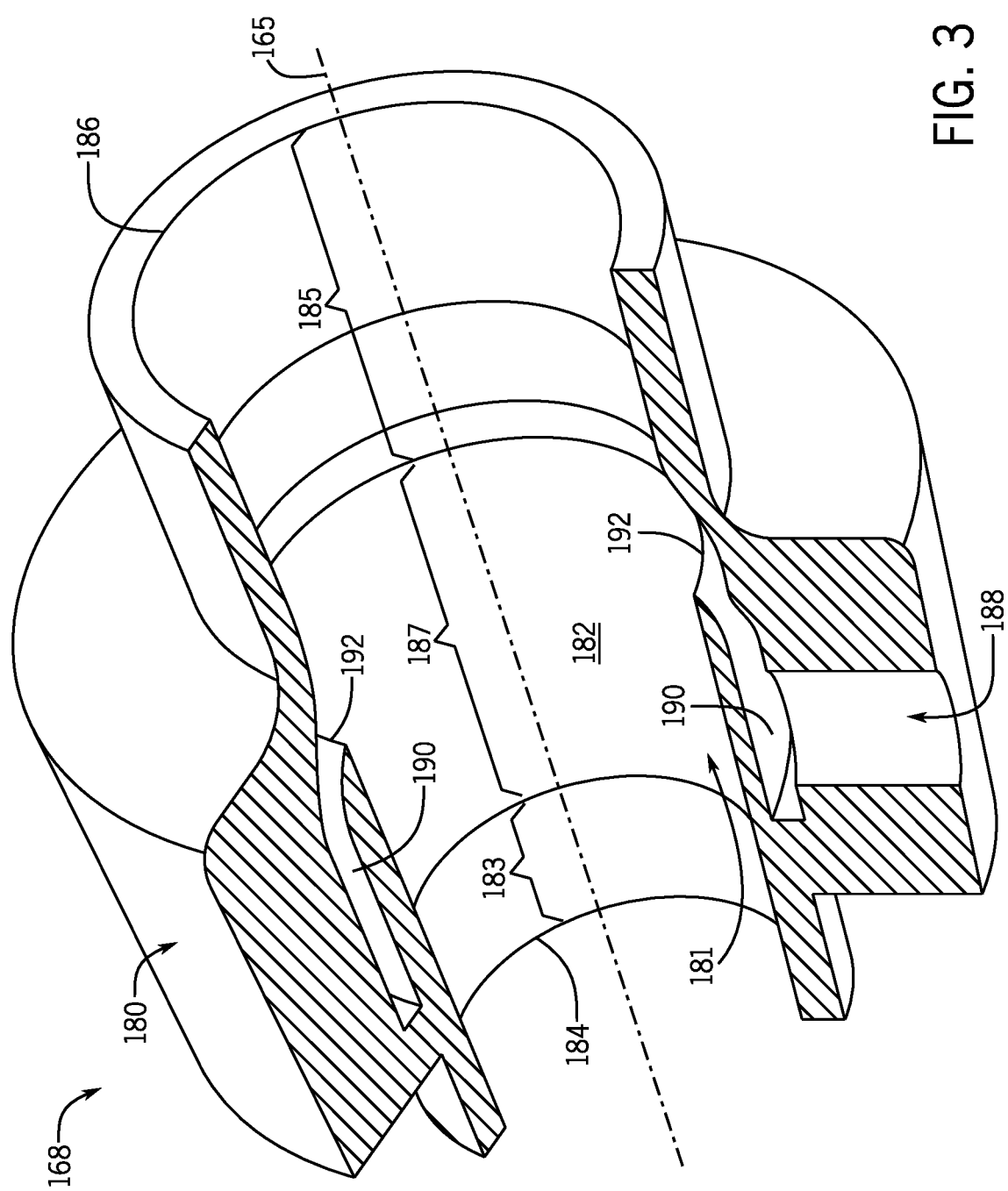
FIG. 3 is an isometric section view of a venturi suction generator structure of the delivery system according to example embodiments.

Referring to FIG. 3, the suction generator structure 168 will be discussed in greater detail according to example embodiments. As shown, the structure 168 may include a substantially annular body 180. The flow passage 182 extends through the body 180 from a commodity inlet 184 to a commodity outlet 186.

The flow passage 182 may have a venturi profile 181. The venturi profile 181 may include a restricting section 183 and an expanding section 185. The expanding section 185 may be disposed downstream relative to the restricting section 183. There may also be an intermediate section 187 disposed between the restricting and expanding sections 183, 185. In the restricting section 183, the diameter of the flow passage 182 may gradually reduce as the flow passage 182 advances in the downstream direction. The length of the restricting section 183 may include the intermediate segment 174 of the second branch flow structure 160. In contrast, in the expanding section 183, the diameter of the flow passage 182 may taper outward and increase in the downward direction. In some embodiments, in the intermediate section 187, the diameter may remain substantially constant. The intermediate section 187 may define a necking down where the diameter of the flow passage 182 is at a minimum.

The suction generator structure 168 may additionally include a compressed air inlet 188. The compressed air inlet 188 may be fluidly connected to a compressed air source 194 as shown in FIG. 2. In some embodiments, the compressed air source 194 may supply at least twenty pounds per square inch (20 psi) of pressure to the inlet 188.

In some embodiments, the compressed air inlet 188 may include a plenum 190. As shown in FIG. 3, the plenum 190 may be annular and may extend continuously about the body 180. The plenum 190 may annularly and continuously surround the flow passage 182. Furthermore, the compressed air inlet 188 may include one or more nozzles 192. The nozzles 192 may be disposed in the intermediate section 187, between the restricting section 183 and the expanding section 185. The nozzles 192 may be directed substantially in the downstream direction along the axis 165. As will be discussed, the compressed air source 194 can selectively supply a compressed airstream to the flow passage 182 as represented by arrows 176. This airstream may be characterized as a low-volume, high pressure airstream 176.

As mentioned above, the control system 140 may include a processor 141. The processor 141 may be in communication with the fan 156 and the compressed air source 194. The control system 140 may also be in communication with the metering system 130. The processor 141 may receive inputs and process those inputs to generate control commands (e.g., for rotating the metering element 134, for operating the fan 156 and generating the airstream 153, and/or for supplying compressed air through the flow passage 182 from the source 194).

More specifically, as the work vehicle 100 is moving through the field during a planting operation, the fan 156 may generate the airstream 153. Also, the metering element 134 may rotate about the axis 139 and meter out commodity from the container 128 to the inlet 166. Additionally, the compressed air source 194 may supply compressed air via the inlet 188, and the nozzles 192 may inject the compressed airstream 176 through the flow passage 182. This may increase suction, for example, proximate the inlet 166. The metered commodity at the inlet 166 may be drawn downstream from the inlet 166 toward the mixture chamber 172. At this point, the metered commodity may enter the airstream 153 to be conveyed further downstream through the run 133.

In some embodiments, the suction (i.e., vacuum) created by the suction generator structure 168 may prevent back flow through the metering system 130. For example, pressure in the commodity container 128 may be approximately equal to pressure at the inlet 166. The pressure at the commodity container 128 may be within +/− one inch of water (1 in H$_2$O) of the pressure at the inlet 166.

As such, the commodity container 128 may be open to atmosphere, unpressurized, and/or unsealed. Commodity flow from the container 128 through the metering system 130 may be maintained. The suction created by the suction generator structure 168 may be sufficient to prevent backflow of the commodity and/or inefficiency of the metering system 130. Also, there is less likelihood for leakage from the delivery system 132. Moreover, the configuration of the suction generator structure 168 is unlikely to clog with commodity because the commodity inlet and commodity outlet may be longitudinally aligned with the axis 165. The compressed airstream enters internally from the side for improved flow of the commodity through the delivery system.

The foregoing describes one or more example embodiments of the commodity delivery system having a venturi suction generator. It should be noted that other embodiments may fall within the scope of this disclosure. For example, embodiments with multiple metering systems or multiple metering elements may be employed with the disclosed system. In such embodiments, there may one or more runs for each metering system or metering element, and such runs may include multiple branch flow structures for each metering system or metering element, in which case multiple venturi generators may be employed (e.g., one venturi generator being associated with each metering element).

Also, the following examples are provided, which are numbered for easier reference.

1. A work vehicle comprising: a commodity container that contains a commodity; a metering system configured to meter the commodity out from the commodity container at a predetermined rate; a delivery system with a run configured to convey the metered commodity away from the work vehicle, the run comprising: an upstream flow structure having an inlet that is configured to receive the metered commodity from the metering system, the upstream flow structure including a suction generator structure with a flow passage that is in fluid communication with the inlet, the flow passage including a venturi profile with a restricting section and an expanding section; a downstream flow structure that is fluidly connected to the upstream flow structure to receive the metered commodity from the flow passage, the downstream flow structure configured to receive an airstream that conveys the metered commodity in a downstream direction through the downstream flow structure; and a compressed air source that is fluidly connected to the suction generator structure, the compressed air source configured to provide pressurized air through the flow passage to create suction at the inlet that sucks the metered commodity from the inlet and moves the metered commodity away from the inlet and toward the downstream flow structure.

2. The work vehicle of example 1, wherein the upstream flow structure is a second branch flow structure; further comprising a first branch flow structure configured to conduct the airstream in the downstream direction toward the downstream flow structure; and wherein the downstream flow structure includes a mixing chamber that is fluidly connected to the first branch flow structure and the second branch flow structure to receive both of the airstream from the first branch flow structure and the metered commodity from the flow passage.

3. The work vehicle of example 2, further comprising a fan that is operatively connected to the first branch flow structure, the fan configured to blow positive pressure air to create the airstream.

4. The work vehicle of example 2, wherein the first branch flow structure includes an upstream opening that is open to atmosphere, the upstream opening being upstream of the inlet.

5. The work vehicle of example 1, wherein the suction generator structure includes a body, the flow passage extending through the body along an axis, the flow passage including a commodity inlet and a commodity outlet that are centered on the axis, the commodity inlet configured to receive the metered commodity from the inlet for flow toward the commodity outlet and the downstream flow structure; the body including a compressed air inlet that extends through the body, wherein the compressed air inlet is fluidly connected to the flow passage.

6. The work vehicle of example 5, wherein the compressed air inlet includes a plenum configured to receive the compressed air and at least one nozzle configured to direct the compressed air through the flow passage.

7. The work vehicle of example 6, wherein the plenum is annular.

8. The work vehicle of example 6, wherein the at least one nozzle is directed substantially downstream through the flow passage.

9. The work vehicle of example 8, wherein the at least one nozzle is disposed between the restricting section and the expanding section of the venturi profile.

10. The work vehicle of example 1, wherein the metering system includes at least one metering element configured to rotate about a metering axis; wherein the upstream flow structure and the downstream flow structure extend substantially along a delivery axis; and wherein the metering axis is substantially perpendicular to the delivery axis.

11. The work vehicle of example 1, further comprising a control system configured for controlling the compressed air source to selectively provide the pressurized air through the flow passage.

12. The work vehicle of example 1, wherein a tank pressure measured at the commodity container is approximately equal to a delivery pressure measured at the inlet.

13. The work vehicle of example 12, wherein the delivery system is configured to maintain a difference between the tank pressure and the delivery pressure within one inch of water (1 in $H_2O$).

14. The work vehicle of example 1, wherein the commodity container is open to atmosphere.

15. A method of operating a work vehicle comprising: metering, with a metering system, a commodity at a predetermined rate from a commodity container to an inlet; selectively providing a pressurized airflow through a flow passage of a suction generator structure of a delivery system, the flow passage including a venturi profile with a restricting section and an expanding section, the flow passage being downstream of and in fluid communication with the inlet, the selectively provided pressurized airflow creating suction at the inlet to suck the metered commodity from the inlet and move the metered commodity away from the inlet and toward a downstream flow structure; and selectively providing an airstream to the downstream flow structure to convey the metered commodity in a downstream direction through the downstream flow structure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
    a commodity container that contains a commodity;
    a metering system configured to meter the commodity out from the commodity container at a predetermined rate; and
    a delivery system with a run configured to convey the metered commodity, the run comprising:
        an upstream flow structure having an upstream opening that is open to atmosphere and an inlet that is downstream of the upstream opening and configured to receive the metered commodity from the metering system downstream of the upstream opening, the upstream flow structure including a suction generator structure with a flow passage that is in fluid communication with the inlet, the flow passage including a venturi profile with a restricting section and an expanding section;
        a downstream flow structure that is fluidly connected to the upstream flow structure to receive the metered commodity from the flow passage, the downstream flow structure configured to receive an airstream that conveys the metered commodity in a downstream direction through the downstream flow structure; and
        a compressed air source that is fluidly connected to the suction generator structure downstream of the inlet, the compressed air source configured to provide pressurized air through the flow passage to create suction that sucks the metered commodity away from the metering system and toward the downstream flow structure;
        wherein the suction generator structure includes a body, the flow passage extending through the body along an axis, the flow passage including a commodity inlet and a commodity outlet that are centered on the axis, the commodity inlet configured to receive the metered commodity from the inlet for flow toward the commodity outlet and the downstream flow structure.

2. The work vehicle of claim 1, wherein the upstream flow structure includes a first branch flow structure and a second branch flow structure, the first branch flow structure configured to conduct the airstream in the downstream direction toward the downstream flow structure;
    wherein the downstream flow structure includes a mixing chamber that is fluidly connected to the first branch flow structure and the second branch flow structure to receive both of the airstream from the first branch flow structure and the metered commodity from the flow passage.

3. The work vehicle of claim 2, further comprising a fan that is operatively connected to the first branch flow structure, the fan configured to blow positive pressure air to create the airstream.

4. The work vehicle of claim 2, wherein the second branch flow structure includes the upstream opening.

5. The work vehicle of claim 1, wherein the
    body includes a compressed air inlet that extends through the body, wherein the compressed air inlet is fluidly connected to the flow passage.

6. The work vehicle of claim 5, wherein the compressed air inlet includes a plenum configured to receive the compressed air and at least one nozzle configured to direct the compressed air through the flow passage.

7. The work vehicle of claim 6, wherein the plenum is annular.

8. The work vehicle of claim 6, wherein the at least one nozzle at a downstream side of the plenum is directed downstream through the flow passage.

9. The work vehicle of claim 8, wherein the at least one nozzle is disposed between the restricting section and the expanding section of the venturi profile.

10. The work vehicle of claim 1, wherein the metering system includes at least one metering element configured to rotate about a metering axis;
    wherein the upstream flow structure and the downstream flow structure extend along a delivery axis; and
    wherein the metering axis is perpendicular to the delivery axis.

11. The work vehicle of claim 1, further comprising a control system configured for controlling the compressed air source to selectively provide the pressurized air through the flow passage.

12. The work vehicle of claim 1, wherein a tank pressure measured at the commodity container is equal to a delivery pressure measured at the inlet.

13. The work vehicle of claim 1, wherein the delivery system is configured to maintain a difference between a tank pressure at the commodity container and a delivery pressure at the inlet that is within one inch of water.

14. The work vehicle of claim 1, wherein the commodity container is open to atmosphere.

15. A method of operating a work vehicle comprising:
    metering, with a metering system, a commodity at a predetermined rate from a commodity container to an inlet of an upstream flow structure having an upstream opening that is open to atmosphere and upstream of the inlet receiving the metered commodity from the metering system;
    selectively providing a pressurized airflow through a flow passage of a suction generator structure of a delivery system downstream of the inlet, the flow passage including a venturi profile with a restricting section and an expanding section, the flow passage being downstream of and in fluid communication with the inlet, the selectively provided pressurized airflow creating suction to suck the metered commodity away from the metering system and toward a downstream flow structure; and selectively providing an airstream to the downstream flow structure to convey the metered commodity in a downstream direction through the downstream flow structure;

wherein the suction generator structure includes a body, the flow passage extending through the body along an axis, the flow passage including a commodity inlet and a commodity outlet that are centered on the axis, the commodity inlet configured to receive the metered commodity from the inlet for flow toward the commodity outlet and the downstream flow structure.

16. The method of claim 15, wherein selectively providing the airstream includes selectively providing the airstream to a first branch flow structure of the upstream flow structure;

wherein the suction generator structure is included in a second branch flow structure of the upstream flow structure;

wherein the downstream flow structure includes a mixing chamber that is fluidly connected to the first branch flow structure and the second branch flow structure to receive both of the airstream from the first branch flow structure and the metered commodity from the flow passage.

17. The method of claim 16, wherein selectively providing the airstream includes selectively operating a fan that is operatively connected to the first branch flow structure to blow positive pressure air and create the airstream.

18. The method of claim 15, wherein selectively providing the pressurized airflow includes creating a tank pressure measured at the commodity container equal to a delivery pressure measured at the inlet.

19. The method of claim 15, further comprising maintaining a difference between a tank pressure at the commodity container and a delivery pressure at the inlet that is within one inch of water.

20. A work vehicle comprising:
a commodity container that contains a commodity;
a metering system configured to meter the commodity out from the commodity container at a predetermined rate; and
a delivery system with a run configured to convey the metered commodity away from the work vehicle, the run comprising:
  a first branch flow structure configured to receive an airstream and conduct the airstream in a downstream direction;
  a second branch flow structure having an upstream opening that is open to atmosphere and an inlet that is downstream of the upstream opening and configured to receive the metered commodity from the metering system downstream of the upstream opening, the second branch flow structure including a suction generator structure with a flow passage that is downstream of and in fluid communication with the inlet, the flow passage including a venturi profile with a restricting section and an expanding section;
  a downstream flow structure with a mixing chamber that is fluidly connected to the first branch flow structure and the second branch flow structure to receive the airstream and the metered commodity from the flow passage and convey the metered commodity in the downstream direction; and
  a compressed air source that is fluidly connected to the suction generator structure downstream of the inlet, the compressed air source configured to provide pressurized air through the flow passage to create suction that draws the metered commodity away from the metering system and toward the downstream flow structure;
wherein the suction generator structure includes a body, the flow passage extending through the body along an axis, the flow passage including a commodity inlet and a commodity outlet that are centered on the axis, the commodity inlet configured to receive the metered commodity from the inlet for flow toward the commodity outlet and the downstream flow structure.

* * * * *